(12) United States Patent
Iwamoto et al.

(10) Patent No.: US 7,853,365 B2
(45) Date of Patent: Dec. 14, 2010

(54) OPTIMAL LOAD DISTRIBUTING SYSTEM

(75) Inventors: Tetsuya Iwamoto, Higashimurayama (JP); Tsuneo Watanabe, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 12/112,550

(22) Filed: Apr. 30, 2008

(65) Prior Publication Data

US 2009/0276103 A1 Nov. 5, 2009

(51) Int. Cl.
*G05D 17/00* (2006.01)

(52) U.S. Cl. .......................... 700/295; 700/28; 700/286

(58) Field of Classification Search .................... 700/22, 700/28, 36, 286, 291, 295; 705/400, 412
See application file for complete search history.

(56) References Cited

U.S. PATENT DOCUMENTS

| | | | | |
|---|---|---|---|---|
| 6,021,402 | A * | 2/2000 | Takriti | 705/412 |
| 6,625,520 | B1 * | 9/2003 | Chen et al. | 700/286 |
| 6,681,155 | B1 * | 1/2004 | Fujita et al. | 700/287 |
| 2005/0015283 | A1 * | 1/2005 | Iino et al. | 700/286 |

FOREIGN PATENT DOCUMENTS

JP 3758862 1/2006

* cited by examiner

*Primary Examiner*—Charles R Kasenge
(74) *Attorney, Agent, or Firm*—Oblon, Spivak, McClelland, Maier & Neustadt, L.L.P.

(57) ABSTRACT

A system manages an optimal load distribution of a total output of a power plant composed of a plurality of units. Plant specifications data of each unit required for optimal load distribution is input and stored. Optimal load distribution calculating carries out a calculation based on data stored. The result of the calculation is stored. A sending-end characteristic curve, a fuel cost curve, a curve of the load optimally distributed to each unit versus the total output, a fuel cost curve for the total output, and fuel cost curves for comparison between a conventional load distribution and the optimal load distribution based on stored data are displayed. An optimal load distribution schedule displays a power transmission time schedule table, a power transmission time schedule curve, and a fuel cost comparison table for different operating schemes.

9 Claims, 22 Drawing Sheets

| TIME (hour: minute: second) | TOTAL OUTPUT (MW) | TIME (hour: minute: second) | TOTAL OUTPUT (MW) | TIME (hour: minute: second) | FIRST UNIT (MW) | OPERATION | |
|---|---|---|---|---|---|---|---|
| 0:00:00 | 450.0 | 0:00:00 | 450.0 | 0:00:00 | 163.0 | | |
| 1:15:00 | 510.0 | 1:15:00 | 450.0 | 0:54:29 | 163.0 | up to 226MW | rate 1%/min |
| 4:00:00 | 460.0 | 1:15:00 | 510.0 | 1:15:00 | 226.0 | | |
| 6:00:00 | 300.0 | 4:00:00 | 510.0 | 4:00:00 | 226.0 | down to 179MW | rate 1%/min |
| 8:00:00 | 490.0 | 4:00:00 | 460.0 | 4:15:18 | 179.0 | | |
| 10:00:00 | 600.0 | 6:00:00 | 460.0 | 6:00:00 | 179.0 | down to 130MW | rate 1%/min |
| 11:25:00 | 510.0 | 6:00:00 | 300.0 | 6:15:57 | 130.0 | | |
| 12:00:00 | 475.0 | 8:00:00 | 300.0 | 7:33:57 | 130.0 | up to 210MW | rate 1%/min |
| 13:00:00 | 490.0 | 8:00:00 | 490.0 | 8:00:00 | 210.0 | | |
| 13:30:00 | 440.0 | 10:00:00 | 490.0 | 9:35:54 | 210.0 | up to 284MW | rate 1%/min |
| 15:00:00 | 510.0 | 10:00:00 | 600.0 | 10:00:00 | 284.0 | | |
| 19:00:00 | 560.0 | 11:25:00 | 600.0 | 11:25:00 | 284.0 | down to 226MW | rate 1%/min |
| | | 11:25:00 | 510.0 | 11:43:53 | 226.0 | | |
| AREA FOR INPUT OF DESIRED TOTAL OUTPUT | | 12:00:00 | 510.0 | 12:00:00 | 226.0 | down to 196MW | rate 1%/min |
| | | 12:00:00 | 475.0 | 12:09:46 | 196.0 | | |
| | | 13:00:00 | 475.0 | 12:55:27 | 196.0 | up to 210MW | rate 1%/min |
| | | 13:00:00 | 490.0 | 13:00:00 | 210.0 | | |
| | | 13:30:00 | 490.0 | 13:30:00 | 210.0 | down to 185MW | rate 1%/min |
| | | 13:30:00 | 440.0 | 13:38:08 | 185.0 | | |
| | | 15:00:00 | 440.0 | 14:46:39 | 185.0 | up to 226MW | rate 1%/min |
| | | 15:00:00 | 510.0 | 15:00:00 | 226.0 | | |
| | | 19:00:00 | 510.0 | 18:49:16 | 226.0 | up to 259MW | rate 1%/min |
| | | 19:00:00 | 560.0 | 19:00:00 | 259.0 | | |
| | | 23:59:59 | 560.0 | 23:59:59 | 259.0 | | |
| | | AREA FOR DISPLAY OF DESIRED TOTAL OUTPUT | | | | | |

FIG. 4A(1)

| TIME (hour:minute:second) | SECOND UNIT (MW) | OPERATION | | TIME (hour:minute:second) | TOTAL (MW) |
|---|---|---|---|---|---|
| 0:00:00 | 450.0 | | | 0:00:00 | 450.0 |
| 1:14:04 | 287.0 | down to 284MW | rate 1%/min | 0:54:29 | 450.0 |
| 1:15:00 | 284.0 | | | 1:14:04 | 510.1 |
| 4:00:00 | 284.0 | down to 281MW | rate 1%/min | 1:15:00 | 510.0 |
| 4:00:56 | 281.0 | | | 4:00:00 | 510.0 |
| 6:00:00 | 281.0 | down to 170MW | rate 1%/min | 4:00:56 | 504.2 |
| 6:35:07 | 170.0 | | | 4:15:18 | 460.1 |
| 7:25:12 | 170.0 | up to 280MW | rate 1%/min | 6:00:00 | 460.0 |
| 8:00:00 | 280.0 | | | 6:15:57 | 360.6 |
| 9:48:37 | 280.0 | up to 316MW | rate 1%/min | 6:35:07 | 300.1 |
| 10:00:00 | 316.0 | | | 7:25:12 | 300.0 |
| 11:25:00 | 316.0 | down to 284MW | rate 1%/min | 7:33:57 | 327.7 |
| 11:35:07 | 284.0 | | | 8:00:00 | 490.0 |
| 12:00:00 | 284.0 | down to 279MW | rate 1%/min | 9:35:54 | 490.0 |
| 12:01:34 | 279.0 | | | 9:48:37 | 529.0 |
| 12:59:42 | 279.0 | up to 280MW | rate 1%/min | 10:00:00 | 600.0 |
| 13:00:00 | 280.0 | | | 11:25:00 | 600.0 |
| 13:30:00 | 280.0 | down to 255MW | rate 1%/min | 11:35:07 | 537.0 |
| 13:37:54 | 255.0 | | | 11:43:53 | 510.1 |
| 14:50:50 | 255.0 | up to 284MW | rate 1%/min | 12:00:00 | 510.0 |
| 15:00:00 | 284.0 | | | 12:01:34 | 500.2 |
| 18:54:38 | 284.0 | up to 301MW | rate 1%/min | 12:09:46 | 475.1 |
| 19:00:00 | 301.0 | | | 12:55:27 | 475.0 |
| 23:59:59 | 301.0 | | | 12:59:42 | 488.0 |
| | | | | 13:00:00 | 490.0 |
| | | | | 13:30:00 | 490.0 |
| | | | | 13:37:54 | 440.8 |
| | | | | 13:38:08 | 440.1 |
| | | | | 14:46:39 | 440.0 |
| | | | | 14:50:50 | 452.8 |
| | | | | 15:00:00 | 510.0 |
| | | | | 18:49:16 | 510.0 |
| | | | | 18:54:38 | 526.5 |
| | | | | 19:00:00 | 560.0 |
| | | | | 23:59:59 | 560.0 |

AREA FOR DISPLAY OF OPERATION SCHEDULE OF EACH UNIT AFTER OPTIMAL LOAD DISTRIBUTION

AREA FOR DISPLAY OF TOTAL OUTPUT AFTER OPTIMAL LOAD DISTRIBUTION

FIG. 4A(2)

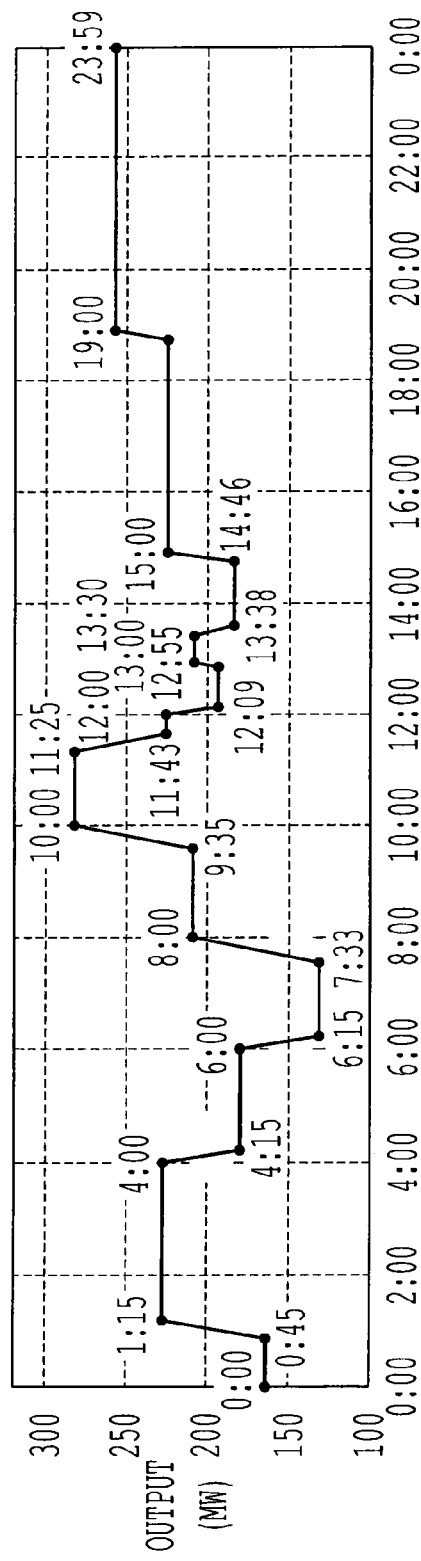
FIG. 4C(1)
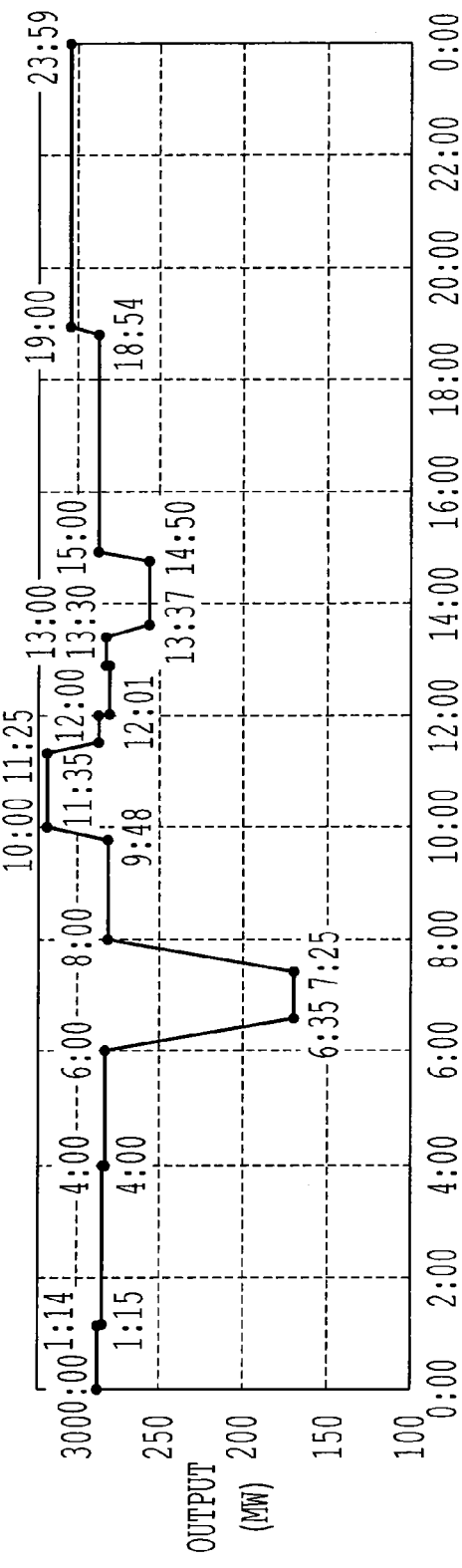
FIG. 4C(2)

| TIME (hour: minute: second) | TOTAL OUTPUT (MW) | TIME (hour: minute: second) | TOTAL OUTPUT (MW) | TIME (hour: minute: second) | FIRST UNIT (MW) | OPERATION | |
|---|---|---|---|---|---|---|---|
| 0:00:00 | 450.0 | 0:00:00 | 450.0 | 0:00:00 | 163.0 | | |
| 1:15:00 | 510.0 | 1:15:00 | 450.0 | 0:54:29 | 163.0 | up to 226MW | rate 1%/min |
| 4:00:00 | 460.0 | 1:15:00 | 510.0 | 1:15:00 | 226.0 | | |
| 6:00:00 | 300.0 | 4:00:00 | 510.0 | 4:00:00 | 226.0 | down to 179MW | rate 1%/min |
| 6:30:00 | 490.0 | 4:00:00 | 460.0 | 4:15:18 | 179.0 | | |
| 10:00:00 | 600.0 | 6:00:00 | 460.0 | 6:00:00 | 179.0 | down to 130MW | rate 1%/min |
| 11:25:00 | 510.0 | 6:00:00 | 300.0 | 6:15:57 | 130.0 | * IMPOSSIBLE OPERATION * | |
| 12:00:00 | 475.0 | 6:30:00 | 300.0 | 6:03:57 | 130.0 | up to 210MW | rate 1%/min |
| 13:00:00 | 490.0 | 6:30:00 | 490.0 | 6:30:00 | 210.0 | | |
| 13:30:00 | 440.0 | 10:00:00 | 490.0 | 9:35:54 | 210.0 | up to 284MW | rate 1%/min |
| 15:00:00 | 510.0 | 10:00:00 | 600.0 | 10:00:00 | 284.0 | | |
| 19:00:00 | 560.0 | 11:25:00 | 600.0 | 11:25:00 | 284.0 | down to 226MW | rate 1%/min |

FIG. 4F(1)

| TIME (hour: minute: second) | SECOND UNIT (MW) | OPERATION | | TIME (hour: minute: second) | TOTAL (MW) |
|---|---|---|---|---|---|
| 0:00:00 | 287.0 | | | 0:00:00 | 450.0 |
| 1:14:04 | 287.0 | down to 284MW | rate 1%/min | 0:54:29 | 450.0 |
| 1:15:00 | 284.0 | | | 1:14:04 | 510.1 |
| 4:00:00 | 284.0 | down to 281MW | rate 1%/min | 1:15:00 | 510.0 |
| 4:00:56 | 281.0 | | | 4:00:00 | 510.0 |
| 6:00:00 | 281.0 | down to 170MW | rate 1%/min | 4:00:56 | 504.2 |
| 6:35:07 | 170.0 | *IMPOSSIBLE OPERATION* | | 4:15:18 | 460.1 |
| 5:55:12 | 170.0 | up to 280MW | rate 1%/min | 6:00:00 | 460.0 |
| 6:30:00 | 280.0 | | | 6:15:57 | 360.6 |
| 9:48:37 | 280.0 | up to 316MW | rate 1%/min | 6:35:07 | 300.1 |
| 10:00:00 | 316.0 | | | 5:55:12 | 300.0 |
| 11:25:00 | 316.0 | down to 284MW | rate 1%/min | 6:03:57 | 327.7 |

FIG. 4F(2)

*If large load change in short time that cannot be dealt with is set, indication of impossible operation is displayed.*

*(Example: \*IMPOSSIBLE OPERATION\*)*

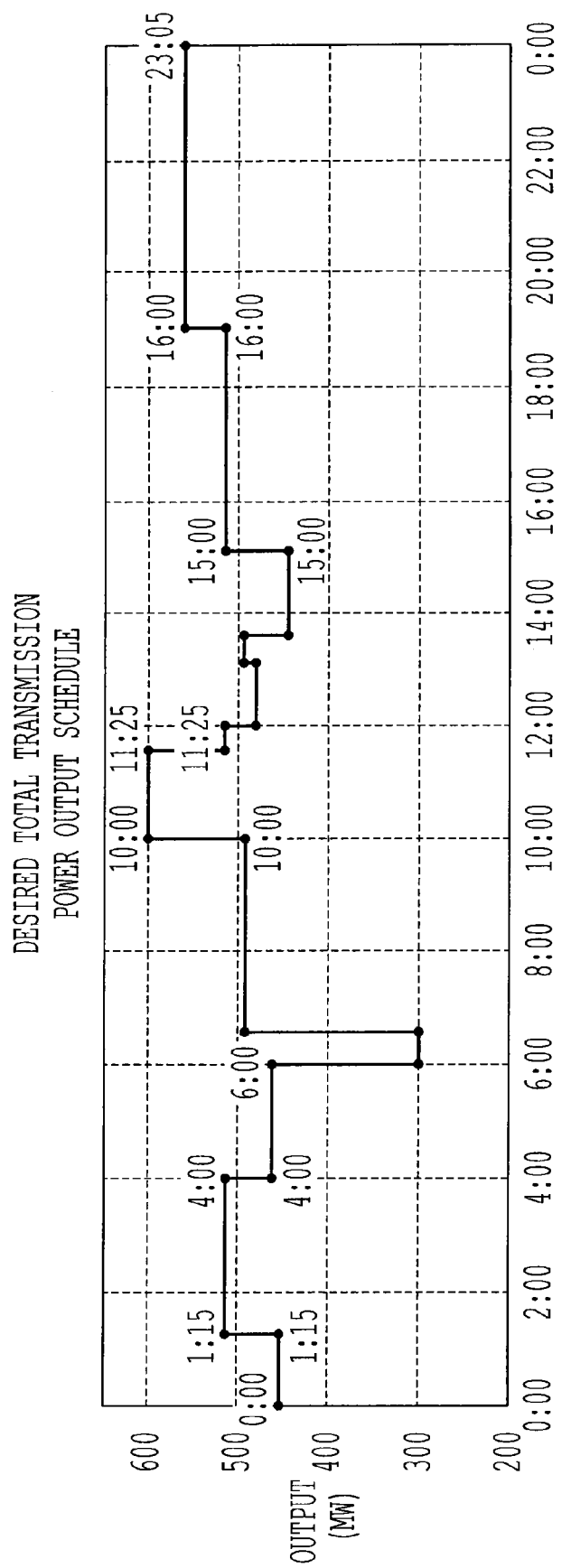
FIG. 4G(1)

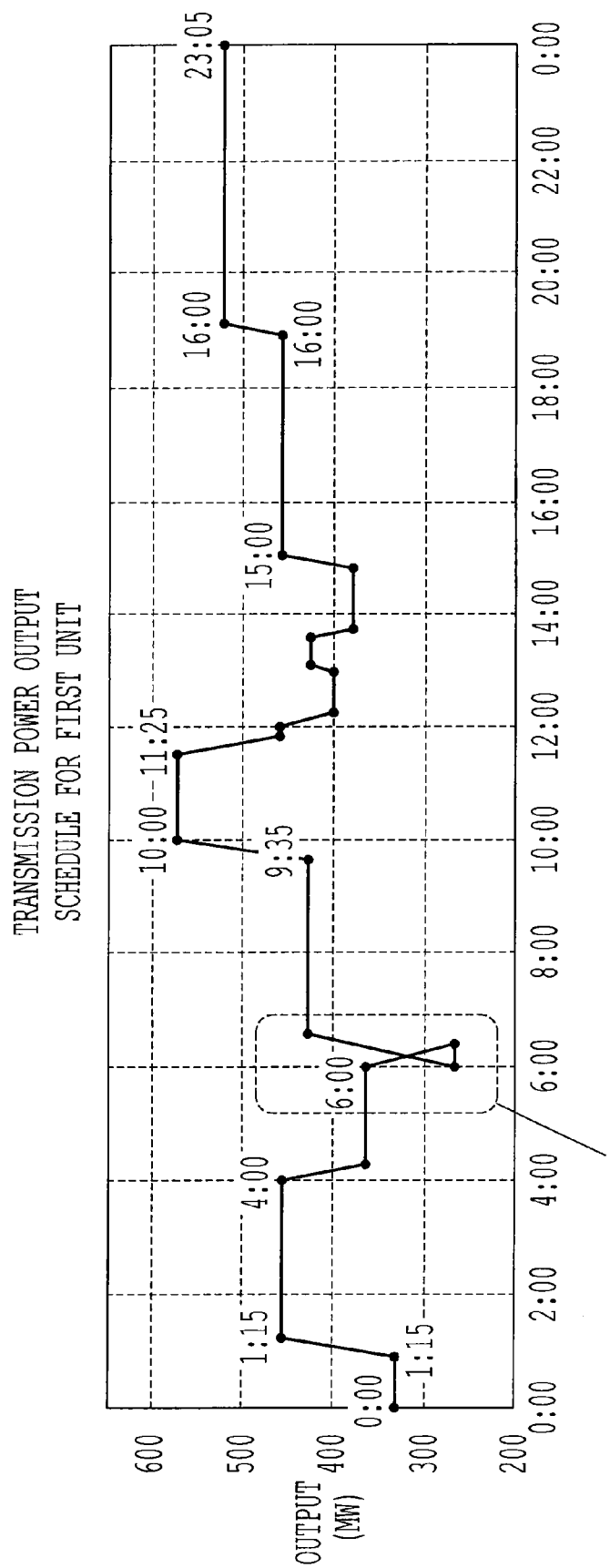
FIG. 4G(2)

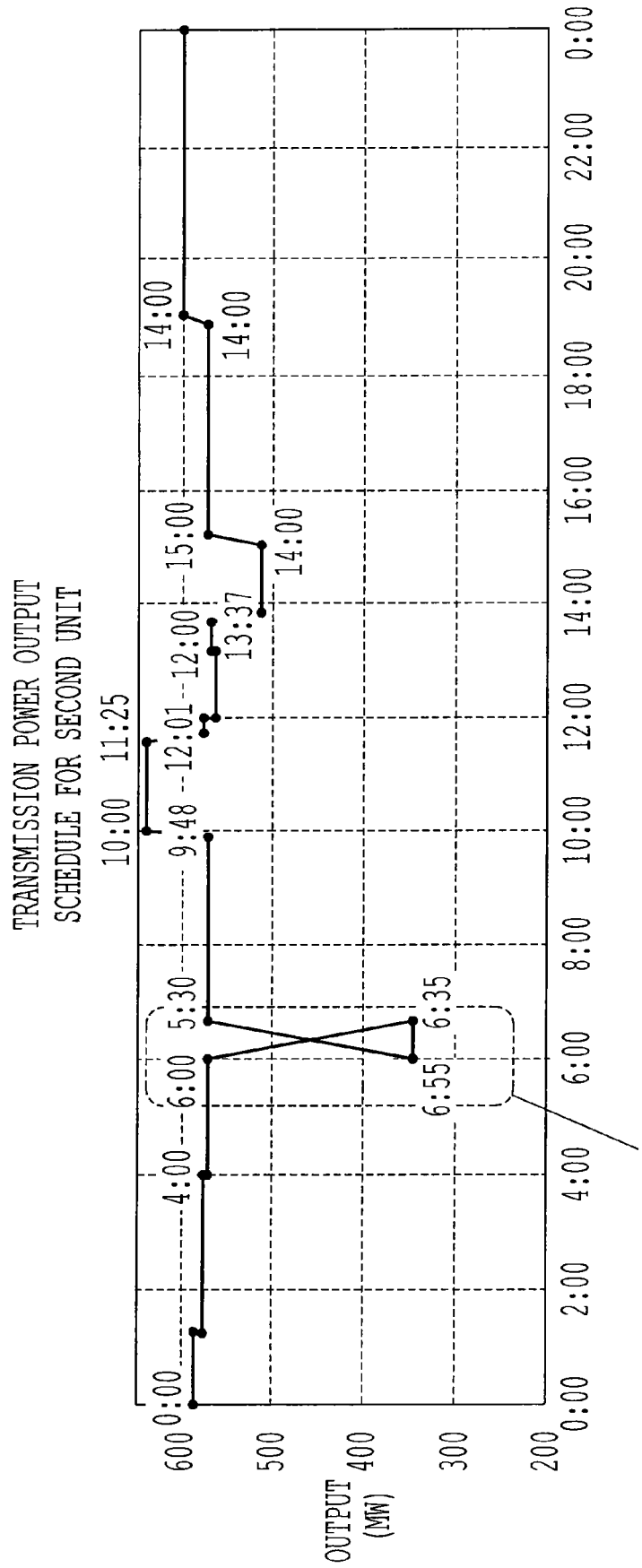
FIG. 4G(3)

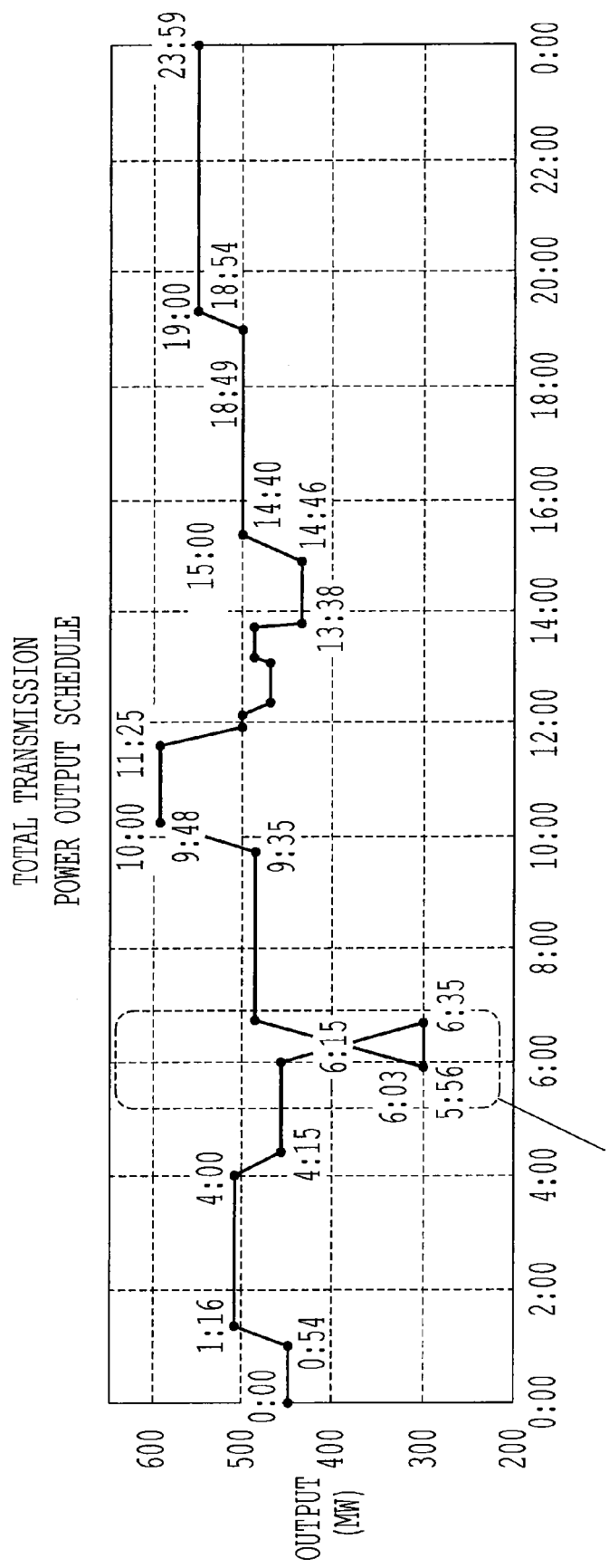
FIG. 4G(4)

A: FUEL COST FOR OPTIMAL OPERATION

| NUMBER OF BREAK-POINTS | | OPTIMAL LOAD DISTRIBUTION (INITIAL) ||||||
|---|---|---|---|---|---|---|---|
| | | TOTAL OUTPUT OF FIRST UNIT (MW) | TOTAL OUTPUT OF SECOND UNIT (MW) | TOTAL FUEL COST OF FIRST UNIT (THOUSAND YUAN) | TOTAL FUEL COST OF SECOND UNIT (THOUSAND YUAN) | FUEL COST (YUAN/MW) | TOTAL FUEL COST (THOUSAND YUAN) |
| 12 | | 61072 | 67250 | 47139 | 58003 | 02954 | 105947 |

| | TIME (hour: minute: second) | TOTAL OUTPUT | OUTPUT OF FIRST UNIT (MW) | ZONE | OUTPUT OF SECOND UNIT (MW) | ZONE | FUEL COST OF FIRST UNIT (THOUSAND YUAN) | FUEL COST OF SECOND UNIT (THOUSAND YUAN) | FUEL COST (YUAN/MW) | |
|---|---|---|---|---|---|---|---|---|---|---|
| 1 | 0:00:00 | 4500 | 1630 | 3 | 2870 | 4 | 1925 | 3132 | 0.9000 | |
| 2 | 1:15:00 | 5100 | 2260 | 4 | 2840 | 4 | 5703 | 6819 | 0.0302 | |
| 3 | 4:00:00 | 4600 | 1790 | 3 | 2810 | 4 | 3358 | 4908 | 0.8979 | |
| 4 | 6:00:00 | 3000 | 1330 | 2 | 1700 | 3 | 2511 | 3074 | 0.0097 | |
| 5 | 8:00:00 | 4900 | 2100 | 3 | 2800 | 4 | 3979 | 4891 | 0.9049 | |
| 6 | 10:00:00 | 2840 | 2840 | 4 | 3160 | 4 | 3652 | 3906 | 0.0891 | |
| 7 | 11:25:00 | 5100 | 2260 | 4 | 2840 | 4 | 121.1 | 1446 | 0.8902 | |
| 8 | 12:00:00 | 4750 | 1960 | 4 | 2790 | 4 | 1821 | 2437 | 0.8964 | |
| 9 | 13:00:00 | 4800 | 2100 | 4 | 3600 | 4 | 80 | 1223 | 0.5649 | |
| 10 | 13:30:00 | 4400 | 1400 | 2 | 3000 | 4 | 201.4 | 3926 | 0.9909 | |
| 11 | 15:00:00 | 5100 | 2260 | 4 | 2840 | 4 | 8302 | 9919 | 0.8902 | |
| 12 | 19:00:00 | 5600 | 2590 | 4 | 3010 | 4 | 1.1794 | 1.2198 | 0.8001 | |
| 13 | 20:53:00 | 5600 | 2530 | 4 | 3010 | 4 | | | | |
| 14 | | | | | | | | | | |
| 15 | | | | | | | | | | |
| 16 | | | | | | | | | | |

FIG. 6A

B: FUEL COST FOR OPTIMAL OPERATION TAKING INTO AUXILIARY MACHINE ACCOUNT

| ANNUAL COST COMPARISON (THOUSAND YUAN) | 1861 |
|---|---|
| DAILY COST COMPARISON (THOUSAND YUAN) | 06 |

OPTIMAL LOAD DISTRIBUTION (INITIAL)

| TOTAL OUTPUT OF FIRST UNIT (MW) | TOTAL OUTPUT OF SECOND UNIT (MW) | TOTAL FUEL COST OF FIRST UNIT (THOUSAND YUAN) | TOTAL FUEL COST OF SECOND UNIT (THOUSAND YUAN) | FUEL COST (YUAN/MW) | TOTAL FUEL COST (THOUSAND YUAN) |
|---|---|---|---|---|---|
| 61072 | 67250 | 47139 | 58003 | 02954 | 105947 |

| OUTPUT OF FIRST UNIT (MW) | ZONE | OUTPUT OF SECOND UNIT (MW) | ZONE | FUEL COST OF FIRST UNIT (THOUSAND YUAN) | FUEL COST OF SECOND UNIT (THOUSAND YUAN) | FUEL COST (YUAN/MW) | FUEL COST DIFFERENCE (YUAN/MW) |
|---|---|---|---|---|---|---|---|
| 1630 | 3 | 2870 | 4 | 1925 | 3132 | 0.8990 | 0.0000 |
| 2260 | 4 | 2840 | 4 | 5708 | 6819 | 0.0932 | 0.0000 |
| 1790 | 3 | 2810 | 4 | 2353 | 4909 | 0.8979 | 0.0000 |
| 1300 | 2 | 1700 | 3 | 2511 | 3074 | 0.9007 | 0.0000 |
| 2100 | 3 | 2800 | 4 | 3979 | 4891 | 0.8949 | 0.0000 |
| 2840 | 4 | 3160 | 4 | 3652 | 3906 | 0.0891 | 0.0000 |
| 2260 | 4 | 2840 | 4 | 121.1 | 1445 | 0.8932 | 0.0000 |
| 1960 | 4 | 2790 | 4 | 182.1 | 2437 | 0.8964 | 0.0000 |
| 2100 | 4 | 2800 | 4 | 970 | 1223 | 0.8949 | 0.0000 |
| 1850 | 2 | 2560 | 4 | 2591 | 3353 | 0.9007 | 0.0000 |
| 2260 | 43 | 2840 | 4 | 8302 | 9919 | 0.8932 | 0.0000 |
| 2500 | 4 | 3010 | 4 | 1.1794 | 1.2138 | 0.9801 | 0.0000 |
| 2590 | 4 | 3010 | 4 | | | | 0.0000 |
| | | | | | | | 0.0000 |
| | | | | | | | 0.0000 |
| | | | | | | | 0.0000 |

FIG. 6B

C: FUEL COST FOR CONVENTIONAL OPERATION
(EQUAL LOAD DISTRIBUTION)

| | ANNUAL COST COMPARISON (THOUSAND YUAN) | 41377 |
|---|---|---|
| | DAILY COST COMPARISON (THOUSAND YUAN) | 113 |

OPTIMAL LOAD DISTRIBUTION (INITIAL)

| TOTAL OUTPUT OF FIRST UNIT (MW) | TOTAL OUTPUT OF SECOND UNIT (MW) | TOTAL FUEL COST OF FIRST UNIT (THOUSAND YUAN) | TOTAL FUEL COST OF SECOND UNIT (THOUSAND YUAN) | FUEL COST (YUAN/ MW) | TOTAL FUEL COST (THOUSAND YUAN) |
|---|---|---|---|---|---|
| 61072 | 67250 | 47139 | 58003 | 02954 | 105947 |

| OUTPUT OF FIRST UNIT (MW) | ZONE | OUTPUT OF SECOND UNIT (MW) | ZONE | FUEL COST OF FIRST UNIT (THOUSAND YUAN) | FUEL COST OF SECOND UNIT (THOUSAND YUAN) | FUEL COST (YUAN/ MW) | FUEL COST DIFFERENCE (YUAN/ MW) |
|---|---|---|---|---|---|---|---|
| 2226 | 4 | 2274 | 4 | 2559 | 2508 | 0.9008 | 0.0019 |
| 2519 | 4 | 2681 | 4 | 6318 | 6219 | 0.0909 | 0.0007 |
| 2275 | 4 | 2325 | 4 | 4177 | 4098 | 0.8895 | 0.0015 |
| 1495 | 3 | 1505 | 3 | 2649 | 2752 | 0.9334 | 0.0027 |
| 2421 | 4 | 2479 | 4 | 4427 | 4952 | 0.8008 | 0.0009 |
| 2968 | 4 | 3042 | 4 | 3801 | 3759 | 0.3894 | 0.0003 |
| 2519 | 4 | 2581 | 4 | 1340 | 1319 | 0.8939 | 0.0007 |
| 2348 | 4 | 2402 | 4 | 2151 | 2112 | 0.8975 | 0.0012 |
| 2421 | 4 | 2479 | 4 | 1107 | 1088 | 0.8908 | 0.0009 |
| 2178 | 4 | 2222 | 4 | 3008 | 2948 | 0.9023 | 0.0024 |
| 2519 | 4 | 2681 | 4 | 9190 | 9045 | 0.8909 | 0.0007 |
| 2789 | 4 | 2937 | 4 | 1.1794 | 1.2548 | 0.9005 | 0.0004 |
| 2763 | 4 | 2837 | 4 | | | | 0.0000 |
| | | | | | | | 0.0000 |
| | | | | | | | 0.0000 |
| | | | | | | | 0.0000 |
| | | | | | | | 0.0000 |

FIG. 6C

OPTIMAL LOAD DISTRIBUTING SYSTEM

BACKGROUND OF THE INVENTION

1. Field of the Invention

The present invention relates to an optimal load distributing system in a power plant. In particular, it relates to a system that carries out optimal load distribution taking the fuel cost into account.

2. Related Art

In general, a power plant is composed of a plurality of units, and the operational plan of each unit is determined according to the total output designated by the load dispatching office. According to the prior art, the way of distributing the load among the units to achieve the total output depends on the experience of the operator, and the power transmission cost is not always minimized.

In recent years, electricity markets have been established, and power companies have been demanded to improve the operational efficiency. Thus, there is a demand for a feature that helps distribute the load among the units in such a manner that the transmission power cost for the total power designated by the load dispatching office is minimized.

Japanese Patent Laid-Open No. 2000-78750 discloses an idea of operation optimization. However, according to this idea, an optimization calculation is carried out in real time based on sensor information from the actual plant, and a sub-controller is operated in real time for each unit of the power plant to save energy and improve the efficiency.

SUMMARY OF THE INVENTION

Occasionally, however, construction of the optimization model is too complicated, so that input parameters cannot be set, and the operation optimization cannot be used.

The present invention has been made in view of such circumstances, and an object of the present invention is to provide an operation schedule that minimizes the fuel cost that involves a minimum number of input parameters, is calculated offline, and is arranged taking into account the output distribution among a plurality of units that minimizes the fuel cost.

In order to attain the object, the present invention provides an optimal load distributing system that manages an optimal load distribution of a total output of a power plant composed of a plurality of units among the plurality of units, including: data inputting means that is used for inputting plant specifications of each unit required for optimal load distribution; an optimal load distribution input file that stores data input via the data inputting means; optimal load distribution calculating means that carries out an optimal load distribution calculation based on data stored in the optimal load distribution input file; an optimal load distribution output file that stores the result of the calculation carried out by the optimal load distribution calculating means; optimal load distribution pattern displaying means that displays a sending-end characteristic curve for each unit, a fuel cost curve for each unit, a curve of the load optimally distributed to each unit versus the total output, a fuel cost curve for the total output, and fuel cost curves for comparison between a conventional load distribution and the optimal load distribution based on data stored in the optimal load distribution output file and the optimal load distribution input file; and optimal load distribution schedule displaying means that displays a power transmission time schedule table, a power transmission time schedule curve, and a fuel cost comparison table for different operating schemes, and an optimal load distributing method for managing an optimal load distribution of a total output of a power plant composed of a plurality of units among the plurality of units, including: inputting plant specifications of each unit required for optimal load distribution and storing input data; carrying out an optimal load distribution calculation based on the data and storing the result of the calculation; displaying a sending-end characteristic curve for each of the plurality of units, a fuel cost curve for each of the plurality of units, a curve of the load optimally distributed to each of the plurality of units versus the total output, a fuel cost curve for the total output, and fuel cost curves for comparison between a conventional load distribution and the optimal load distribution based on the data and the result of the calculation; and displaying a power transmission time schedule table, a power transmission time schedule curve, and a fuel cost comparison table for different operating schemes.

According to the present invention, since plant specification of each of the units forming the power plant are input, a load distribution among the units that minimizes the fuel cost can be calculated for the total output designated from the load dispatching office, and the power plant can be operated based on the load distribution in such a manner that the fuel cost is minimized.

BRIEF DESCRIPTION OF THE DRAWINGS

FIGS. 4A(1) and 4A(2) show a load distribution schedule table for minimizing the fuel cost according to an embodiment 4 of the present invention;

FIGS. 4C(1) and 4C(2) are a diagram showing a transmission power output schedule curve for each unit;

FIGS. 4F(1) and 4F(2) show a schedule table in a case where an impossible desired value is input;

FIGS. 4G(1) to 4G(4) include diagrams for illustrating the case where an impossible desired value is input;

FIGS. 6A, 6B and 6C show a table showing fuel costs for an optimal operation, an optimal operation taking into account an auxiliary machine and a conventional operation for comparison.

DETAILED DESCRIPTION OF THE INVENTION

In the following, embodiments of the present invention will be described with reference to the accompanying drawings.

Embodiment 1

Figure 1:
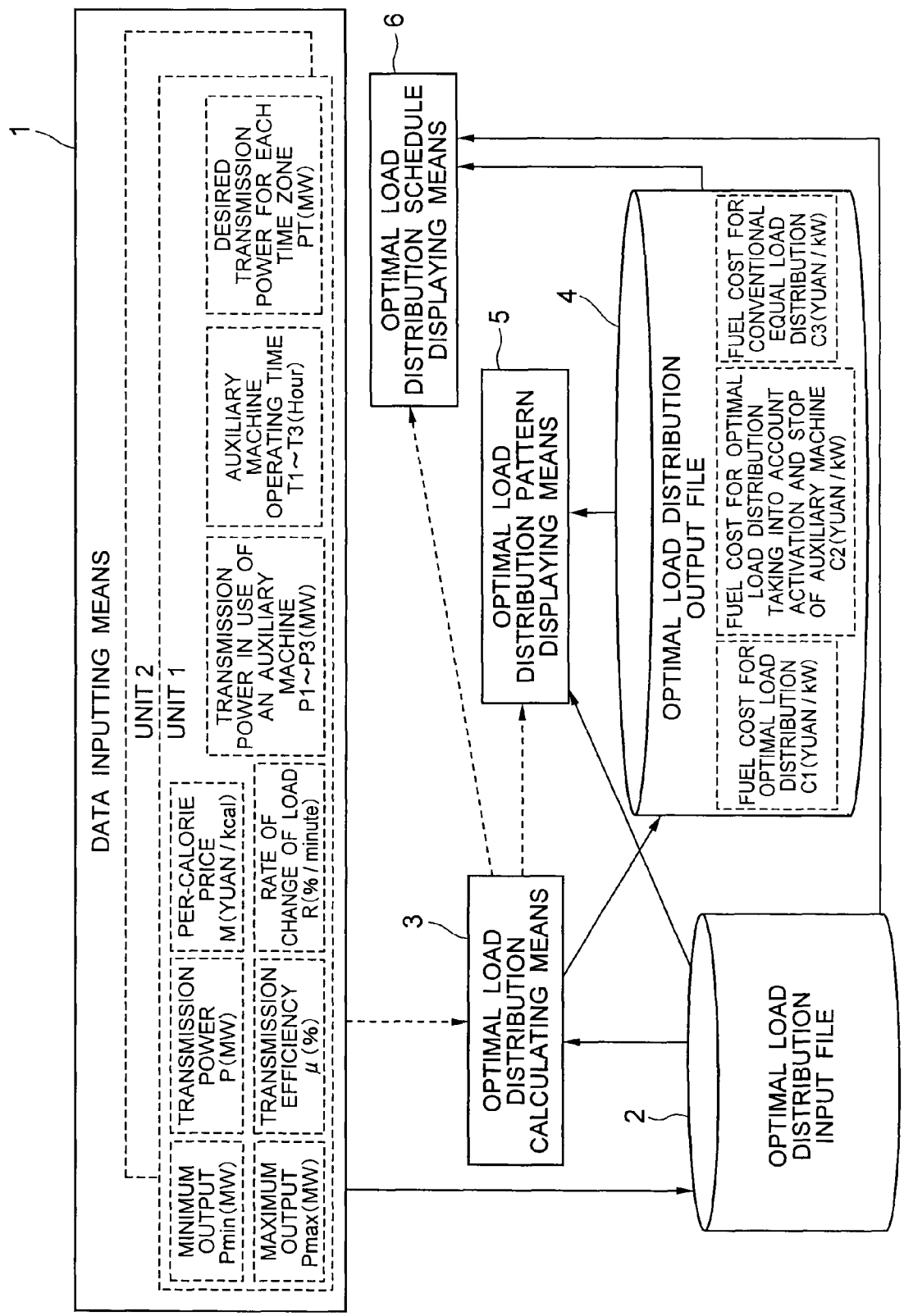
FIG. 1 is a block diagram showing a configuration of an embodiment 1 of the present invention.

FIG. 1 is a diagram showing a configuration of an optimal load distributing system according to an embodiment 1 of the present invention. First, the configuration of the optimal load distributing system according to the embodiment 1 will be described with reference to FIG. 1. According to the embodiment 1, the optimal load distributing system has data inputting means 1 for inputting plant specifications of each unit (two units) required for optimal load distribution, an optimal load distribution input file 2 that stores data input via the data inputting means 1, optimal load distribution calculating means 3 that carries out an optimal load distribution calculation based on the data stored in the optimal load distribution input file 2, an optimal load distribution output file 4 that stores the result of the calculation carried out by the optimal load distribution calculating means 3, optimal load distribution pattern displaying means 5 that displays a sending-end characteristic curve for each unit, a fuel cost curve for each unit, a curve of the load optimally distributed to each unit versus the total output, a fuel cost curve for the total output and fuel cost curves for comparison between a conventional load distribution and an optimal load distribution based on the data stored in the optimal load distribution output file 4 and the optimal load distribution input file 2, and optimal load distribution schedule displaying means 6 that displays a power transmission time schedule table, a power transmission time schedule curve, and a fuel cost comparison table for different operating schemes.

Next, an operation of the optimal load distributing system will be described. First, data required for an optimal load distribution calculation is input via the data inputting means 1. Input data items include the minimum output (MW), the maximum output (MW), the transmission power (MW), the transmission efficiency (%) of the transmission power, the per-calorie price (yuan/kcal), the rate of change of load (%/minute), the transmission power in use of an auxiliary machine (MW), the auxiliary machine operating time (Hour), and the desired transmission power (MW) for each time zone. While the prices are expressed in Chinese yuan, of course, the present invention can be applied to other currency units.

Next, a calculation of the fuel cost will be described step by step. The calculation involves the following items.

Items concerning heat input
Unit fuel price K (yuan/kg)
Fuel calorific value L (kcal/kg)
Fuel use G (kg)
Per-calorie price M (yuan/kcal)=K/L
Heat input Q (kcal)=G×L
Total cost N (yuan)=Q×M
Items concerning heat output
Output power P (MW)=P×860×1000 (kcal)
Efficiency $\mu$ (%)
Power generating cost C (yuan/kW)

The efficiency is determined by dividing the heat output by the heat input.

[Formula 1]

$$\mu = \frac{P \times 860 \times 1000}{Q} \times 100 \quad (1)$$

$$= \frac{P}{Q} \times 8.6 \times 10^7$$

This formula can be reduced to an equation of Q (the amount of heat input required to achieve the output power P) as follows.

[Formula 2]

$$Q = \frac{P}{\mu} \times 8.6 \times 10^7 \quad (2)$$

The fuel cost is determined by dividing the total cost by the amount of electric power generated.

[Formula 3]

$$C = \frac{Q \times M}{P \times 1000} \quad (3)$$

$$= \frac{\frac{P}{\mu} \times 8.6 \times 10^4 \times M}{P \times 1000}$$

$$= \frac{M}{\mu} \times 8.6 \times 10^4 \quad (4)$$

Therefore, the fuel cost can be determined from the per-calorie price (yuan/kcal) and the efficiency (%).

[Formula 4]

Supposing that $\mu = f(P)$, $$C = \frac{M}{f(P)} \times 8.6 \times 10^4 \quad (5)$$

From the formula (3), the fuel cost of the two units (a first unit and a second unit) can be determined as follows.

[Formula 5]

$$C = \frac{Q_1 \times M_1 + Q_2 \times M_2}{(P_1 + P_2) \times 1000} \quad (6)$$

$$= \frac{\frac{P_1}{\mu_1} \times 8.6 \times 10^7 \times M_1 + \frac{P_2}{\mu_2} \times 8.6 \times 10^7 \times M_2}{(P_1 + P_2) \times 1000}$$

$$= \frac{1}{P_1 + P_2} \times \left( \frac{P_1 \times M_1}{\mu_1} + \frac{P_2 \times M_2}{\mu_2} \right) \times 8.6 \times 10^4 \quad (7)$$

Supposing that $\mu_1 = f_1(P_1)$, $\mu_2 = f_2(P_2)$ and $T = P_1 + P_2$, $$C = \frac{1}{T} \times \left( \frac{P_1 \times M_1}{f_1(P_1)} + \frac{(T - P_1) \times M_2}{f_2(P_2)} \right) \times 8.6 \times 10^4 \quad (8)$$

The fuel cost C (yuan/kWh) required to achieve the total output T (MW) varies with the output P1 (MW) of the first unit. The value of the output P1 that minimizes the fuel cost C can be determined using the formula (8).

Figure 2A:
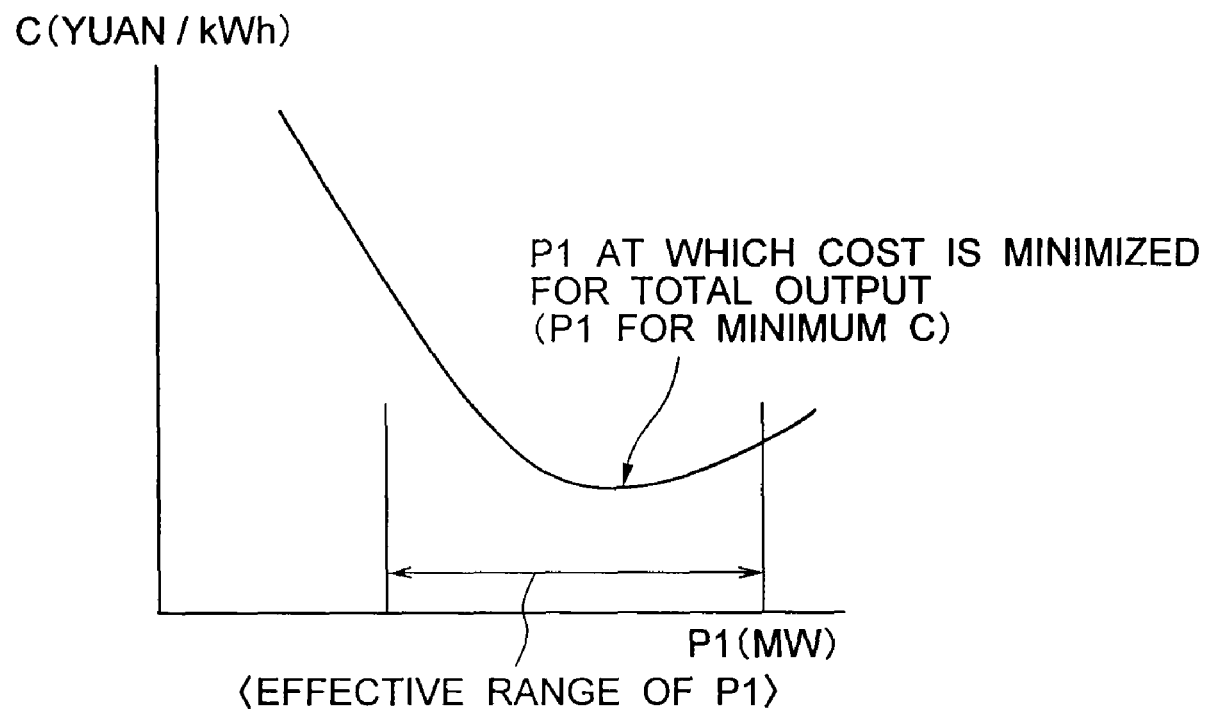
FIG. 2A is a characteristic graph showing how the fuel cost varies with the ratio of P1 to a total output T of a power plant.

FIG. 2A shows how the fuel cost varies with the ratio of the output P1 of the first unit to the total output T. The effective range of the output P1 has to meet the following condition.

<Effective Range of P1>

The effective range of the output P1 should be the smaller of a range {(P1≧minimum output of the relevant unit) and (P1≦maximum output of the relevant unit)}, and a range {(P1≦total output T)}.

As described above, according to the embodiment 1, since plant specifications of each unit (two units) are input, the load distribution among the units that minimizes the fuel cost can be calculated for the total output designated by a load dispatching office.

Embodiment 2

In the following, an embodiment 2 of the present invention will be described. The configuration of an optimal load distributing system of the embodiment 2 is the same as that of the embodiment 1 except that the data inputting means can deal with three or more units, and therefore, descriptions of the configuration will be omitted.

Figure 2B:
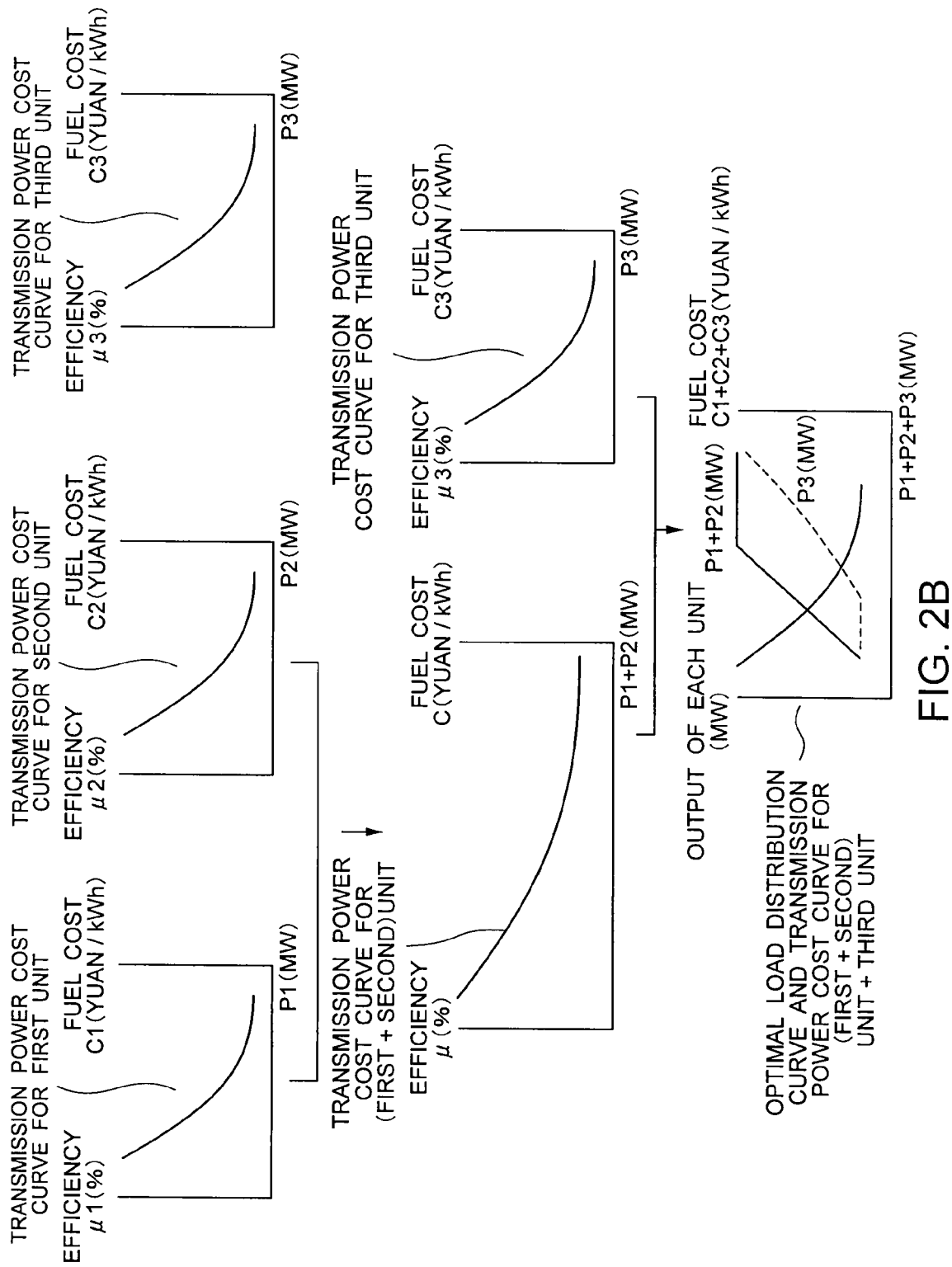
FIG. 2B is a diagram for illustrating an exemplary optimal load distribution calculation in a case where a power plant is composed of three or more units according to an embodiment 2 of the present invention.

Next, an operation of the optimal load distributing system will be described. FIG. 2B shows an exemplary optimal load distribution calculation involved in the operation according to the embodiment 2. The input/output data items and the calculation methods are the same as in the embodiment 1 except for the number of units.

In the embodiment 2, it is supposed that optimal load distribution among three units (a first unit, a second unit and a third unit) is calculated. In the case where there are three or more units, those units are grouped into two virtual units. In the embodiment 2, the first and the second unit are grouped as a virtual N-th unit. It is desirable that units that are as close in rated load and amount of fuel use as possible are grouped together.

To apply the calculation formulas in the embodiment 1, the total efficiency of the virtual N-th unit has to be determined from the formula (8) in the embodiment 1. The efficiency can be determined by dividing the heat output by the heat input according to the formula (1) in the embodiment 1.

Supposing that the output of the first generator is P1 (MW), and the output of the second generator is P2 (MW), the heat output of the virtual N-th unit can be determined according to the following formula.

Heat output of virtual $N$-th unit=$(P1+P2)\times 860\times 1000$ (kcal)

Next, the heat input of the virtual N-th unit will be determined. Since the heat input is the amount of input heat, the heat input can be determined from the fuel calorific value (kcal/kg) and the fuel use (kg).

Supposing that the fuel calorific value of the first unit is Q1 (kcal/kg), the fuel calorific value of the second unit is Q2 (kcal/kg), the fuel use of the first unit is G1 (kg), and the fuel use of the second unit is G2 (kg), the heat input of the virtual N-th unit can be determined according to the following formula.

Heat input of virtual $N$-th unit=$(Q1\times G1)+(Q2\times G2)$ (kcal)

Therefore, the efficiency p of the virtual N-th unit can be determined according to the following formula.

$$\mu = \frac{(P1+P2)\times 860 \times 1000}{(Q1\times G1)+(Q2\times G2)} \times 100 \quad \text{[Formula 6]}$$

From the formula (8) in the embodiment 1, the output power of the third unit and the virtual N-th unit that minimizes the power generating costs of the virtual N-th unit and the third unit can be determined.

Next, the virtual N-th unit is reduced to the first unit and the second unit, and optimal load distribution curves for the first unit and the second unit are determined by carrying out the calculation described in the embodiment 1.

As described above, according to the embodiment 2, even if there are three or more units, the power plant can be operated at the minimum fuel cost by application of the embodiment 1.

Embodiment 3

In the following, an optimal load distributing system according to an embodiment 3 of the present invention will be described. The configuration of the optimal load distributing system of the embodiment 3 is the same as that of the embodiment 1, and therefore, descriptions of the configuration will be omitted.

Next, an operation of the optimal load distributing system will be described. The optimal load distribution pattern displaying means 5 in the embodiment 1 displays the following curves based on the data stored in the optimal load distribution input file 2 and the optimal load distribution output data calculated by the optimal load distribution calculating means 3.

<Output Curves>

Figure 3A:
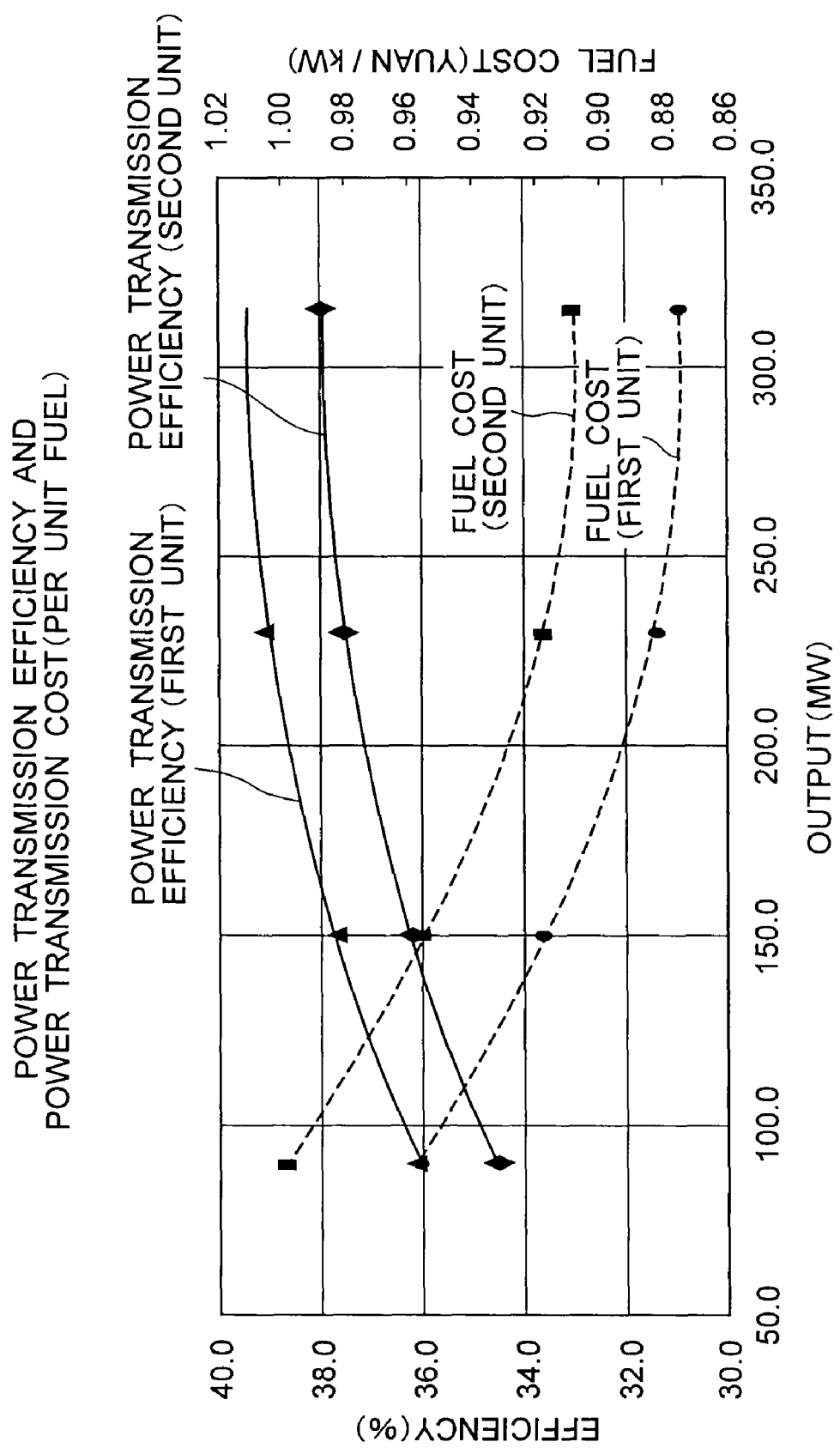
FIG. 3A is a characteristic graph showing a power transmission efficiency characteristic curve and a fuel cost curve for each unit of a power plant according to an embodiment 3 of the present invention.

(1) a sending-end efficiency characteristic curve and a fuel cost curve for each unit (shown in FIG. 3A)

Figure 3B:
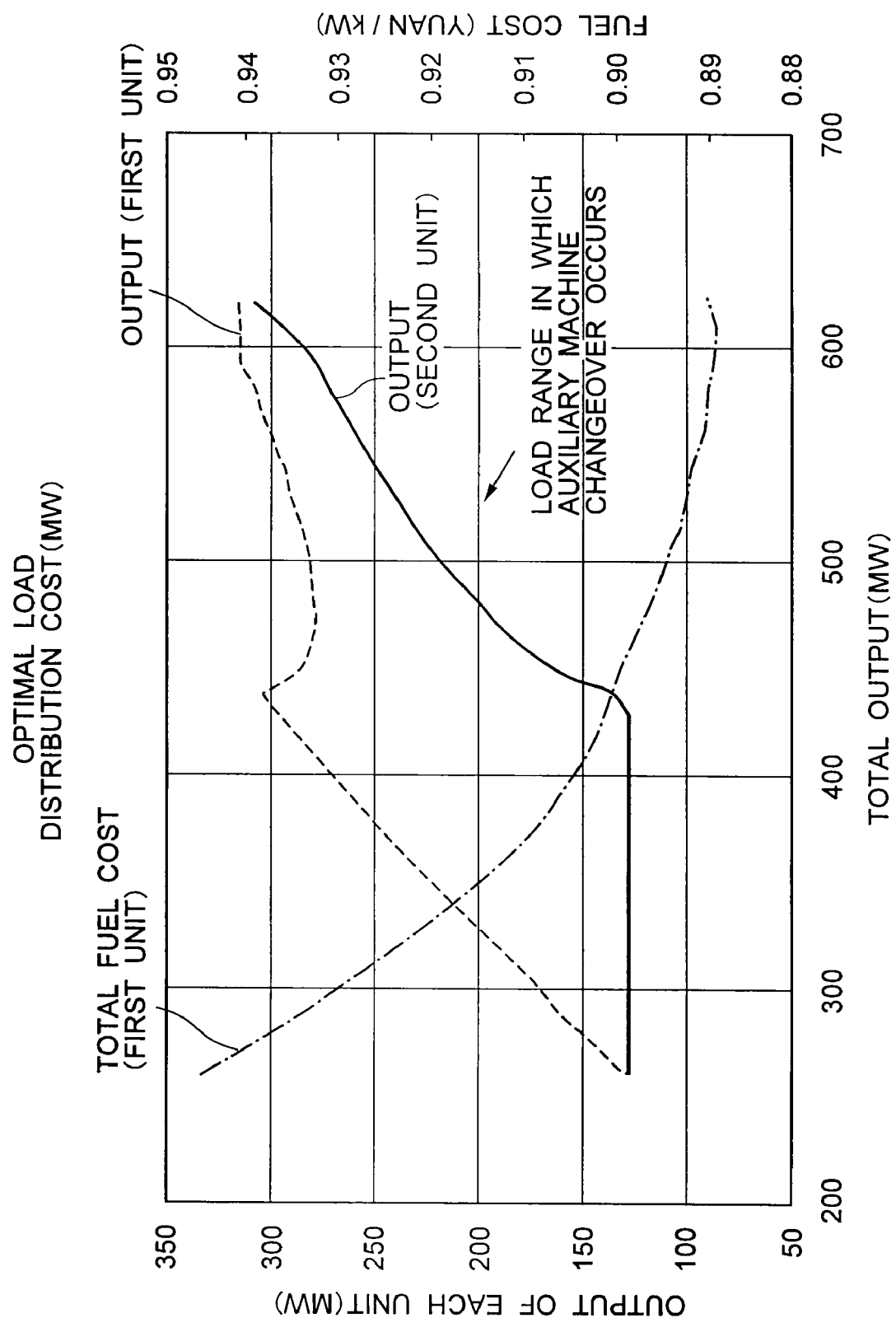
FIG. 3B is a characteristic graph showing a curve of the load optimally distributed to each unit versus the total output of the power plant and a fuel cost curve for the total output.

(2) a curve of the optimal load distributed to each unit versus the total output and a fuel cost curve for the total output (shown in FIG. 3B)

Figure 3C:
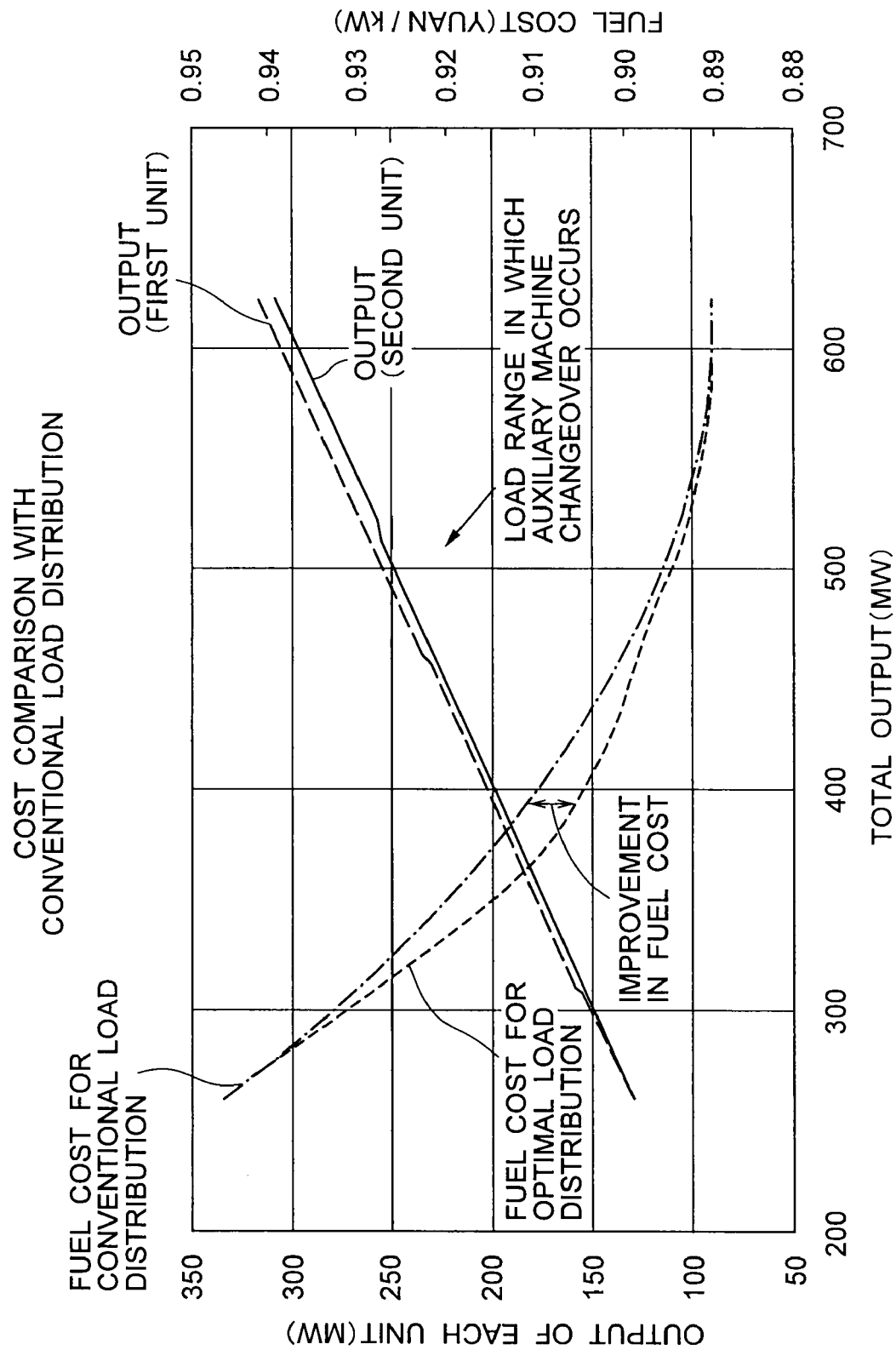
FIG. 3C is a characteristic graph showing fuel cost curves for comparison between a conventional (equal) load distribution and an optimal load distribution.

(3) a fuel cost curve for conventional load distribution (equal load distribution) and a curve for comparison between the conventional load distribution and the optimal distribution (shown in FIG. 3C)

The sending-end efficiency characteristic curve for each unit shown in FIG. 3A is plotted based on the transmission power (MW) and the transmission efficiency (%) of the transmission power input via the data inputting means 1.

Similarly, the fuel cost curve (yuan/kW) shown in FIG. 3A can be determined from the per-calorie price (yuan/kcal) and the efficiency (%) according to the formula (4) in the embodiment 1. Thus, the optimal load distribution calculating means 3 calculates the fuel cost (yuan/kW) from the per-calorie price (yuan/kcal) and the efficiency (%) input via the data inputting means 1, and the calculated fuel cost is stored in the optimal load distribution output file 4. Based on the stored data, the fuel cost curve for each unit is displayed.

FIG. 3B shows curves of the loads optimally distributed to the respective units versus the total output. The output of one of the two units that minimizes the fuel cost required to achieve the total output can be determined according to the formula (8) in the embodiment 1. The output of the other unit can be determined by subtracting the output of the one unit from the total output. In this way, the curves of the outputs of both the units versus the total output can be plotted.

Similarly, the fuel cost curve for the total output shown in FIG. 3B is a plot of average values of the fuel costs of the units calculated according to the formula (4) in the embodiment 1.

The curves shown in FIG. 3C include the fuel cost curve for the conventional equally distributed operation and the fuel cost curve for the total output for the optimal operation shown in FIG. 3B, which are displayed on the same screen to enable fuel cost comparison.

As described above, according to the embodiment 3, the output curves of the optimal loads distributed to the respective units and the curve for fuel cost comparison with the conventional operation are visually displayed, and therefore, operators of the power plant can be made more cost-conscious.

Embodiment 4

Next, an embodiment 4 of the present invention will be described. The configuration of an optimal load distributing system of the embodiment 4 is the same as that of the embodiment 1, and therefore, descriptions of the configuration will be omitted.

Next, an operation of the optimal load distributing system will be described with reference to FIGS. 4A(1) and 4A(2). The table shown in FIGS. 4A(1) and 4A(2) is generally divided into four areas described below and is displayed on the optimal load distribution schedule displaying means 6 in the embodiment 1.

(1) area for input of the desired total output
(2) area for display of the desired total output
(3) area for display of the operation schedule of each unit after optimal load distribution
(4) area for display of the total output after optimal load distribution The four areas will be described below.

(1) The area for input of the desired total output is an area to which a desired total output value for each time zone in a day is input via the data inputting means 1 in the embodiment 1. For example, the total output of 450 MW at 0:00, the total output of 510 MW at 1:15 and the total output of 460 MW at 4:00 are input.

After the data is input, the optimal load distribution calculating means 3 in the embodiment 1 carries out calculations, and the resulting values are displayed in the (2) area for display of the desired total output, the (3) area for display of the operation schedule of each unit after optimal load distribution and the (4) area for display of the total output after optimal load distribution.

Figure 4B:
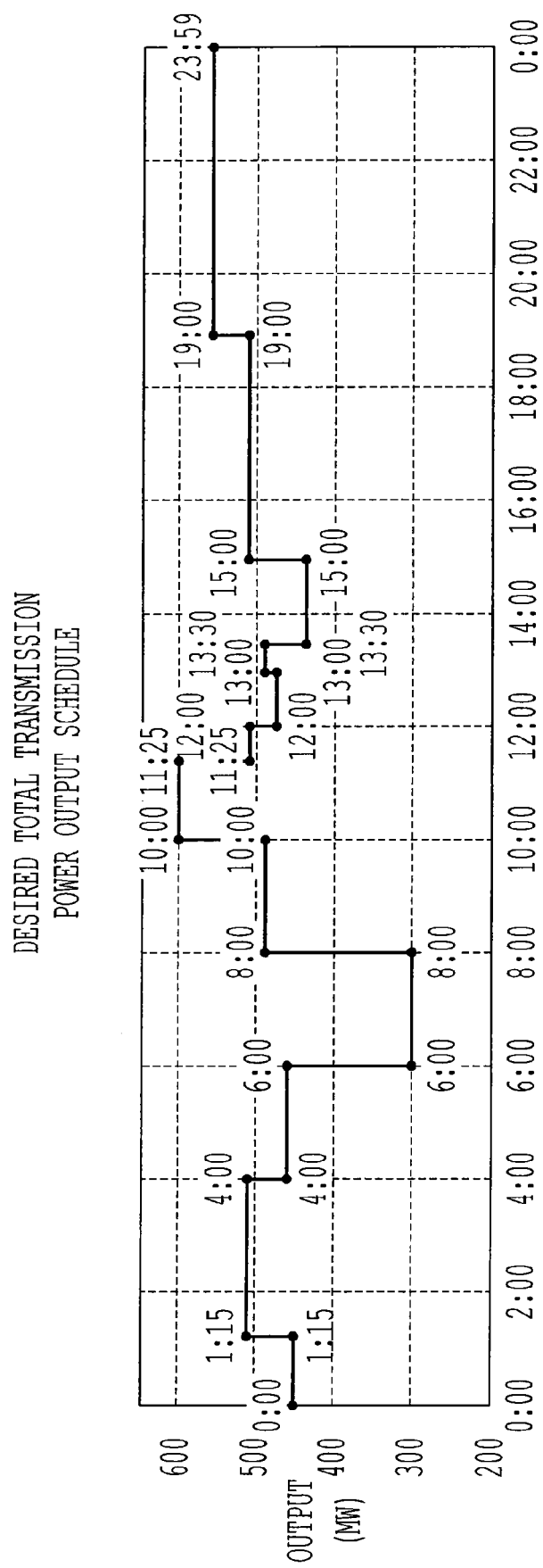
FIG. 4B is a diagram showing a desired total transmission power output schedule curve.

(2) Based on the values displayed in the area for display of the desired total output, the desired total transmission power output schedule curve shown in FIG. 4B is displayed. In FIG. 4B, the graph has a step-like shape because the previous desired output is maintained until immediately before the desired time to change the desired output.

(3) In the area for display of the operation schedule of each unit after optimal load distribution, output values after optimal load distribution calculated by the optimal load distribution calculating means 3 in the embodiment 1 and times of day are displayed.

Based on the data, the transmission power output schedule curve for each unit shown in FIGS. 4C(1) and 4C(2) is displayed. In the actual plant operation, a certain length of time is required to achieve the desired output, and therefore, the graph does not have the step-like form shown in FIG. 4B. Therefore, the time of increasing or decreasing the load is adjusted using the rate of change of load (%/minute) input via the data inputting means 1 in the embodiment 1.

Specifically, in the case of increasing the load, the load starts to be gradually increased before the desired time. The time of starting to increase the load is calculated based on the rate of change of load so that the desired output is achieved at the desired time. In the case of decreasing the load, the load starts to be decreased based on the rate of change of load after the desired time.

Figure 4D:
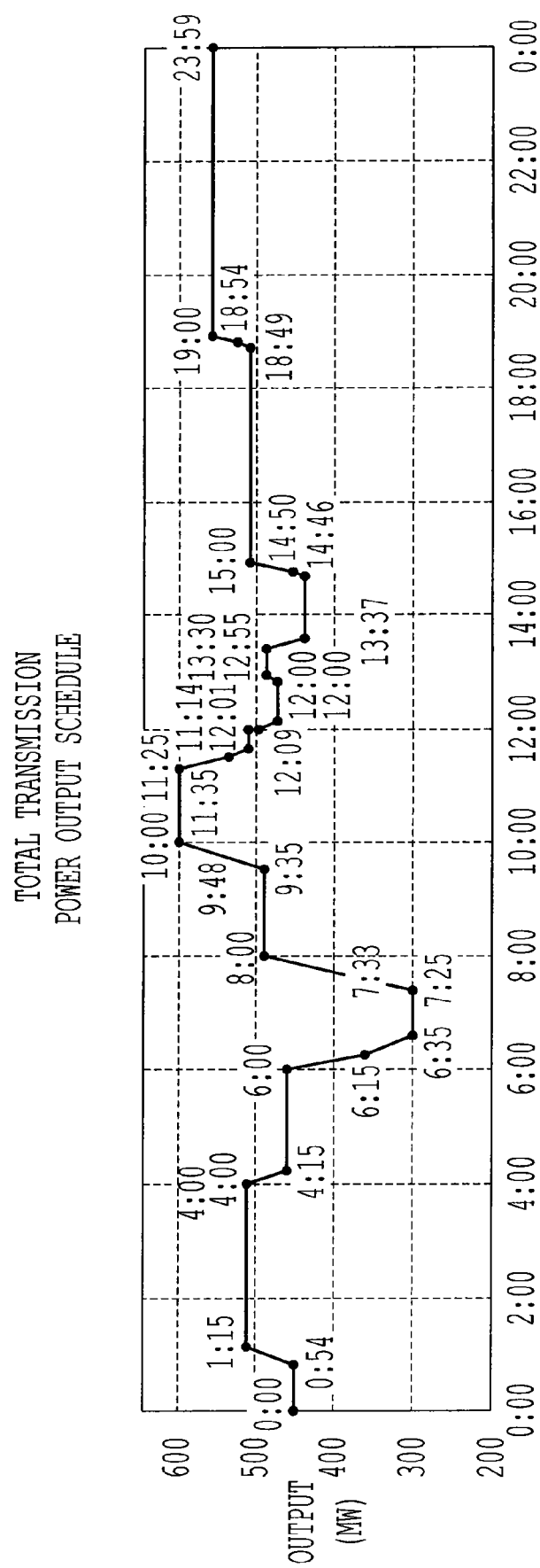
FIG. 4D is a diagram showing a total transmission power output schedule for the entire plant.
Figure 4E:
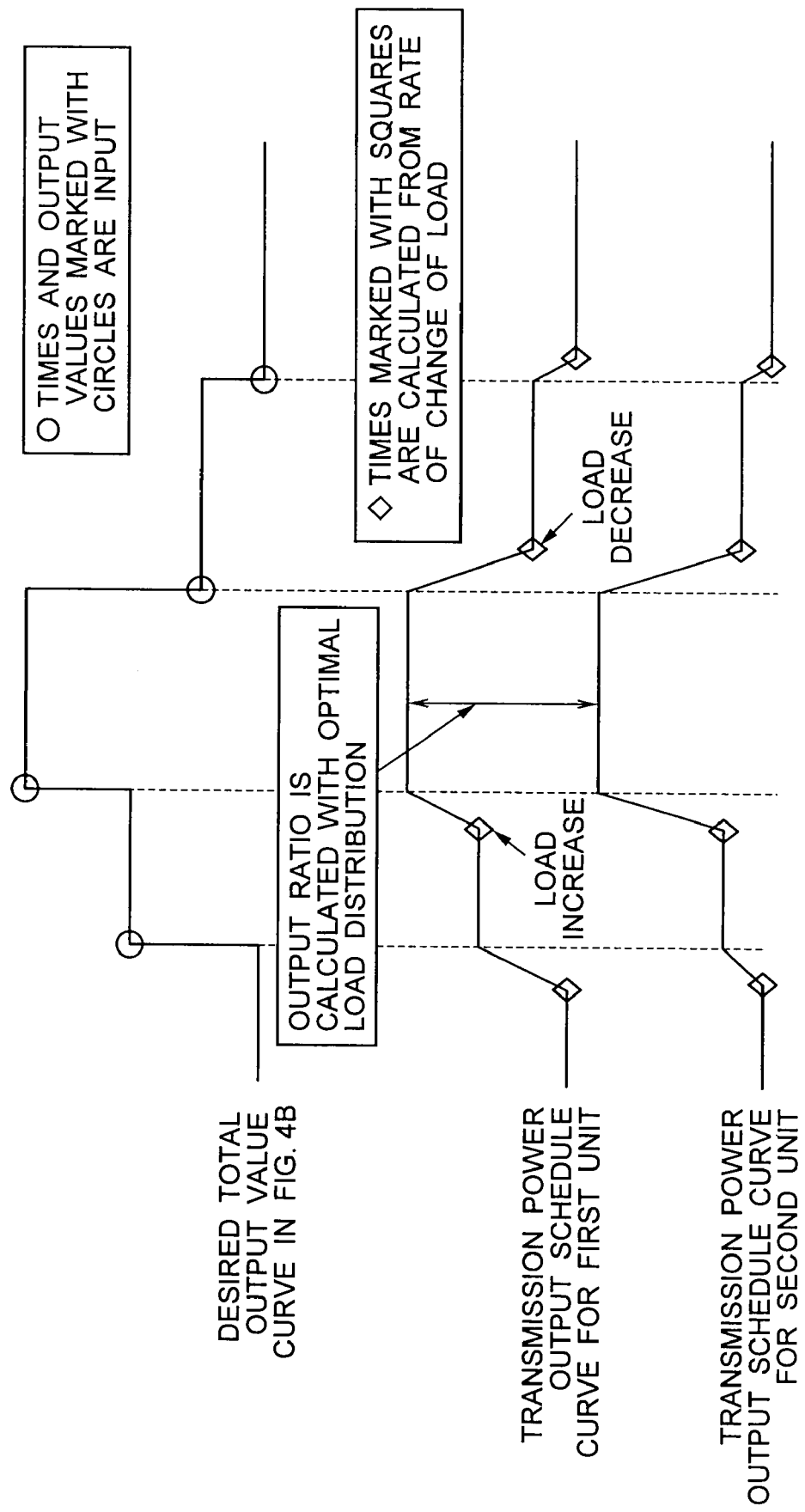
FIG. 4E is a diagram showing curves in a case where the rate of change of load is taken into account.

The time of starting to increase the load and the time of completing the load decrease thus calculated are also displayed in the (3) area for display of the operation schedule of each unit after optimal load distribution. FIG. 4E shows a specific example of curves plotted taking the rate of change of load into account.

If a large load change in a short time that the procedure based on the rate of change of load is too slow to deal with is set, an indication of an impossible operation is displayed. FIGS. 4F(1) and 4F(2) show a specific example (a schedule table) in the case where an impossible desired value is set, and FIGS. 4G(1)-4G(4) shows a specific example (curves) in the case where an impossible desired value is set.

(4) The area for display of the total output after optimal load distribution displays the total outputs at the times of change of load for each unit displayed in the (3) area for display of the operation schedule of each unit after optimal load distribution by sorting the times in chronological order. FIG. 4D shows a transmission power output schedule curve for the entire plant based on the data.

As described above, according to the embodiment 4, the operation schedule table for each unit after optimal load distribution and the operation schedule curve for each unit can be displayed, and therefore, it is possible to help operators to adjust the output to achieve an optimal operation.

In addition, since the time of starting to increase the load and the time of completing the load decrease are calculated, the power guarantee, which is important in electric power selling, can be provided. In addition, even if data that causes an inconsistency in the operation of the plant is input, an indication of an impossible operation is displayed, and therefore, an erroneous operation due to the erroneous data can be avoided.

Embodiment 5

Next, an embodiment 5 of the present invention will be described. The configuration of an optimal load distributing system of the embodiment 5 is the same as that of the embodiment 1, and therefore, descriptions of the configuration will be omitted.

Figure 5:
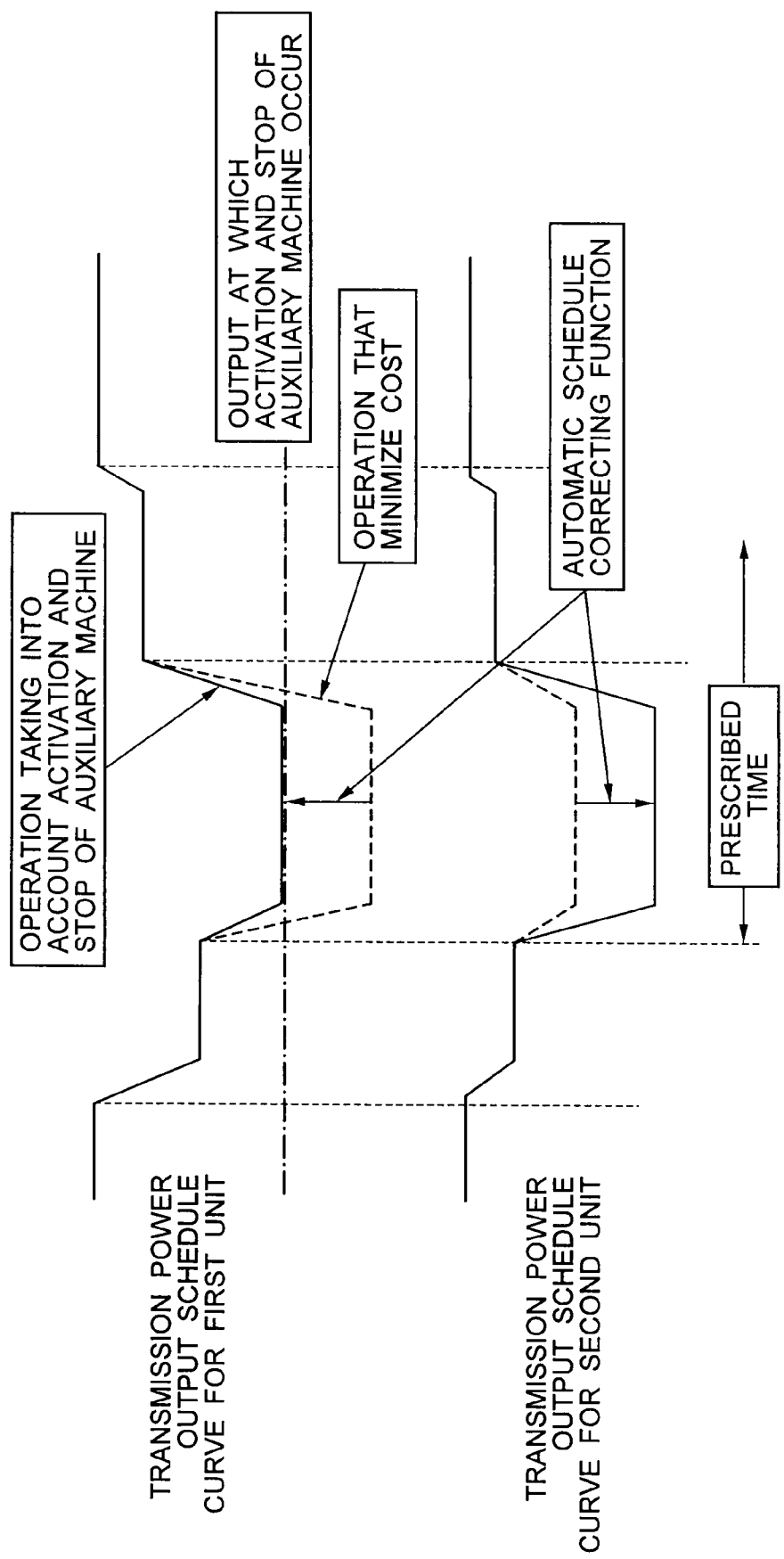
FIG. 5 is a diagram showing an operation example in which activation and stop of an auxiliary machine is taken into account.

Next, an operation of the optimal load distributing system will be described with reference to FIG. 5. Based on the transmission power in use of an auxiliary machine and the auxiliary machine operating time input via the data inputting means 1 in the embodiment 1, the optimal load distribution calculating means in the embodiment 1 carries out an optimal load distribution calculation taking into account activation and stop of an auxiliary machine.

Specifically, when an optimal load distribution that minimizes the fuel cost is calculated, if the resulting auxiliary machine operating time is equal to or lower than the previously input auxiliary machine operating time, and the resulting transmission power in use of an auxiliary machine is equal to or lower than the previously input transmission power in use of an auxiliary machine, rescheduling can be carried out to automatically switch from the schedule that minimizes the fuel cost to a schedule that involves neither activation nor stop of an auxiliary machine.

If rescheduling of the optimal load distribution for one unit causes activation and stop of an auxiliary machine in the other unit, the rescheduling of the optimal load distribution for the one unit is stopped, and the schedule that gives priority to fuel cost reduction is adopted.

As described above, according to the embodiment 5, in addition to the optimal load distribution that minimizes the fuel cost, a schedule that minimizes the frequency of activations and stops of an auxiliary machine is possible. Therefore, in addition to the fuel cost reduction, the maintenance cost of the auxiliary machines can be reduced.

Embodiment 6

An embodiment 6 of the present invention will be described. The configuration of an optimal load distributing system of the embodiment 6 is the same as that of the embodiment 1, and therefore, descriptions of the configuration will be omitted.

Next, an operation of the optimal load distributing system will be described with reference to FIGS. 6A, 6B and 6C. Based on the data input via the data inputting means 1 in the embodiment 1, the optimal load distribution calculating means 3 calculates the fuel cost in the case where the plant is operated by optimally distributing the load, the fuel cost in the case where the plant is operated by optimally distributing the load taking into account activation and stop of an auxiliary machine, and the fuel cost in the case where the plant is operated by conventionally equally distributing the load, and the results are stored in the optimal load distribution output file 4.

Next, the optimal load distribution schedule displaying means 6 displays the daily fuel price and the daily fuel cost for each operation pattern (for each unit) from the fuel cost for each pattern stored in the optimal load distribution output file 4.

For comparison, the difference between the cost in the case where the plant is operated by optimally distributing the load and the cost in the case where the plant is operated by optimally distributing the load taking into account activation and stop of an auxiliary machine, and the difference between the cost in the case where the plant is operated by optimally distributing the load and the cost in the case where the plant is operated by conventionally equally distributing the load are also displayed. Both the daily cost and the annual cost can be displayed for comparison.

As described above, according to the embodiment 6, fuel costs for a plurality of patterns can be compared. Therefore, it is possible to make operators more cost-conscious and help managers to manage the electric power selling cost.

What is claimed is:

1. An optimal load distributing system that manages an optimal load distribution of a total output of a power plant composed of a plurality of units among the plurality of units, comprising:
   data inputting means that is used for inputting plant specifications of each unit required for optimal load distribution;
   an optimal load distribution input file that stores data input via said data inputting means;
   optimal load distribution calculating means that carries out an optimal load distribution calculation based on data stored in said optimal load distribution input file;
   an optimal load distribution output file that stores the result of the calculation carried out by said optimal load distribution calculating means;
   optimal load distribution pattern displaying means that displays a sending-end characteristic curve for each unit, a fuel cost curve for each unit, a curve of the load optimally distributed to each unit versus the total output, a fuel cost curve for the total output, and fuel cost curves for comparison between a conventional load distribution and the optimal load distribution based on data stored in said optimal load distribution output file and said optimal load distribution input file; and
   optimal load distribution schedule displaying means that displays a power transmission time schedule table, a power transmission time schedule curve, and a fuel cost comparison table for different operating schemes.

2. The optimal load distributing system according to claim 1, further comprising means capable of carrying out an optimal load distribution calculation for three or more units by grouping the three or more units into two virtual units and applying an optimal load distribution calculation for two units to the two virtual units.

3. The optimal load distributing system according to claim 1, wherein said optimal load distribution pattern displaying means visually displays the calculated load distributed to each unit versus the total output and a total fuel cost.

4. The optimal load distributing system according to claim 1, wherein the optimal load distribution calculation is carried out based on an input desired transmission power output value for each time zone, and an operation schedule table and an operation schedule curve that describe an optimal load distribution among the units are displayed.

5. The optimal load distributing system according to claim 4, wherein when an operation schedule is to be displayed, the operation schedule is designed to minimize the number of activations and stops of an auxiliary machine based on a transmission power in a case where an auxiliary machine changeover occurs and a minimum auxiliary machine operating time input via said data inputting means.

6. The optimal load distributing system according to claim 5, wherein, in a case where a large load change in a short time that exceeds the processing capacity of the system occurs, an operational inconsistency in which the load has to be increased before the load is completely decreased is calculated, and the inconsistent status is visually displayed.

7. The optimal load distributing system according to claim 1, wherein a total fuel cost is compared among three cases including a case where the load is conventionally (equally) distributed among the units, a case where the load is distributed among the units by taking into account activations and stops of an auxiliary machine, and a case where the load is optimally distributed by giving priority to cost reduction.

8. The optimal load distributing system according to claim 4, wherein desired total output values (time of day and output) are previously input, the load starts to be gradually increased before a desired time according to the rate of change of load for each unit so that a desired output is achieved at a desired time in a case of increasing the load, the load starts to be decreased after a desired time and a desired load achievement time is calculated in a case of decreasing the load, and the optimal load distribution schedule displaying means displays the result.

9. An optimal load distributing method for managing an optimal load distribution of a total output of a power plant composed of a plurality of units among the plurality of units, comprising:

inputting plant specifications of each unit required for optimal load distribution and storing input data;

carrying out an optimal load distribution calculation based on said data and storing the result of the calculation;

displaying a sending-end characteristic curve for each of said plurality of units, a fuel cost curve for each of said plurality of units, a curve of the load optimally distributed to each of said plurality of units versus the total output, a fuel cost curve for the total output, and fuel cost curves for comparison between a conventional load distribution and the optimal load distribution based on said data and the result of said calculation; and displaying a power transmission time schedule table, a power transmission time schedule curve, and a fuel cost comparison table for different operating schemes.

* * * * *